(12) United States Patent
Davis et al.

(10) Patent No.: US 8,787,201 B2
(45) Date of Patent: Jul. 22, 2014

(54) SYSTEM AND METHODS FOR DESIGNING NETWORK SURVEILLANCE SYSTEMS

(75) Inventors: Alan W. Davis, Houston, TX (US); Daniel G. Johnson, Humble, TX (US)

(73) Assignee: Iomnis LLC, Houston, TX (US)

( * ) Notice: Subject to any disclaimer, the term of this patent is extended or adjusted under 35 U.S.C. 154(b) by 246 days.

(21) Appl. No.: 12/688,504

(22) Filed: Jan. 15, 2010

(65) Prior Publication Data

US 2011/0176454 A1    Jul. 21, 2011

(51) Int. Cl.
*H04L 12/28*    (2006.01)

(52) U.S. Cl.
USPC .......................................................... 370/254

(58) Field of Classification Search
USPC .......................................................... 370/254
See application file for complete search history.

(56) References Cited

U.S. PATENT DOCUMENTS

| | | | | |
|---|---|---|---|---|
| 5,341,477 A | * | 8/1994 | Pitkin et al. | 709/226 |
| 6,795,858 B1 | * | 9/2004 | Jain et al. | 709/226 |
| 6,970,183 B1 | * | 11/2005 | Monroe | 348/143 |
| 7,275,053 B1 | | 9/2007 | Gardner et al. | |
| 7,415,385 B2 | * | 8/2008 | Azarbayejani et al. | 702/182 |
| 2003/0002489 A1 | * | 1/2003 | Bulick et al. | 370/354 |
| 2005/0197993 A1 | * | 9/2005 | Korotky | 706/52 |
| 2007/0074148 A1 | * | 3/2007 | Morgan | 717/101 |
| 2007/0094062 A1 | * | 4/2007 | Tracy et al. | 705/8 |
| 2008/0046551 A1 | * | 2/2008 | Hall | 709/223 |
| 2009/0027495 A1 | * | 1/2009 | Oskin et al. | 348/143 |
| 2009/0189981 A1 | * | 7/2009 | Siann et al. | 348/143 |
| 2010/0050172 A1 | * | 2/2010 | Ferris | 718/1 |

OTHER PUBLICATIONS

International Search Report and Opinion for International Application No. PCT/US2011/021237.
Written Opinion of the International Searching Authority for PCT/US2011/021237.

* cited by examiner

*Primary Examiner* — Mark Rinehart
*Assistant Examiner* — Christopher R Crompton
(74) *Attorney, Agent, or Firm* — Baker Botts L.L.P.

(57) ABSTRACT

Systems and methods for efficiently configuring network surveillance systems are disclosed. A network surveillance system is designed by selecting a first component for the network surveillance system. The surveillance performance index for the first component is determined. A second component for the network surveillance system is then selected based on the surveillance performance index of the first component.

20 Claims, 3 Drawing Sheets

| Frame Rate (fps) | Compression Type | Size per Pixel |
|---|---|---|
| Any fps | MJPEG | 0.000104167 kB/pixel |
| 5 fps | MPEG4 | 0.0000625 kB/pixel |
| 10 fps | MPEG4 | 0.000052084 kB/pixel |
| 20 fps | MPEG4 | 0.000046875 kB/pixel |
| 30 fps | MPEG4 | 0.000041667 kB/pixel |
| 5 fps | H.264 | 0.0000500 kB/pixel |
| 10 fps | H.264 | 0.000041558 kB/pixel |
| 20 fps | H.264 | 0.00003750 kB/pixel |
| 30 fps | H.264 | 0.000033334 kB/pixel |

Figure 4

| Disk Array | SPI |
|---|---|
| Two 15000rpm SAS drives in RAID1 using a non caching LSI controller | 44.67 |
| Six 7200rpm SATA's in RAID 5 on a Dell Perc 6i 256MB caching controller | 66.61 |
| Four 7200rpm SATA's in RAID 1+0 on an Intel ICH9 controller | 83.81 |

Figure 5

| Socket 771 SPI Ratings | | | | |
|---|---|---|---|---|
| CPU | 1 Socket | 2 Sockets | 3 Sockets | 4 Sockets |
| Xeon E5405 (2.0GHz) | 25 | 42.5 | NA | NA |
| Xeon E5410 (2.33GHz) | 29.13 | 49.52 | NA | NA |
| Xeon E5420 (2.5GHz) | 31.25 | 53.13 | NA | NA |
| Xeon E5430 (2.66GHz) | 33.25 | 56.53 | NA | NA |
| Xeon E5440 (2.83GHz) | 35.38 | 60.15 | NA | NA |
| Xeon E5450 (3.0GHz) | 37.5 | 63.75 | NA | NA |
| Xeon E7430 (2.13GHz) | 26.6 | 45.27 | 76.96 | 130.83 |
| Xeon E7440 (2.4GHz) | 33.0 | 51.01 | 86.7 | 147.39 |
| Xeon X7350 (2.93GHz) | 36.5 | 62.75 | 107.38 | 183.24 |

Figure 6

SYSTEM AND METHODS FOR DESIGNING NETWORK SURVEILLANCE SYSTEMS

TECHNICAL FIELD

The present disclosure relates generally to surveillance systems, and, more particularly, to a system and methods for efficiently configuring network surveillance systems.

BACKGROUND

Video surveillance systems are commonly used to detect incidents that a user may deem desirable. For instance, surveillance systems may be used at banks, stores and homes. Typically, a user installs one or more cameras at a desired location and the images captured by the cameras are communicated to a device for viewing and/or recording. The user may then view the transmitted images. The images may be communicated from the camera to the recording device or a monitor through a wired or wireless network.

Modern video surveillance systems may include one or more cameras which use the Internet Protocol to transmit image data and control signals over a network. These cameras are commonly referred to as IP cameras. IP cameras capture and send video footage over an Internet Protocol network, such as an Ethernet Link, allowing users to view, record, store and manage their video surveillance images either locally or remotely over a network infrastructure. IP cameras can be placed anywhere there is an IP network connection. In addition to streaming video footage, IP cameras may include other functionalities such as, for example, pan/tilt/zoom operation, motion detection, audio surveillance, integration with alarms, automated alerts, and intelligent video analytics.

In order to ensure the proper operation of a network surveillance system, it is important that the selected components be compatible. However, the methodology for determining performance characteristics of a surveillance security server has always proven difficult. For instance, the network server utilized must match the system requirements. The demands placed on the network server may be affected by a number of variables including the bandwidth requirements of the system components, the desired frame rates for the surveillance system, the storage capacities of the system components and the different options of the surveillance software. In order to maximize the efficiency of a video surveillance system, a user must select the right server for the desired system configuration.

Typically, the user has to go through a number of iterations when selecting the components of the network surveillance system to achieve an optimal result. For example, the user will select an initial configuration for the video surveillance system. The user may then go through a number of iterations, based on trial and error, in order to identify the network server that is best suited for the selected system configuration. Moreover, if the user decides to change an existing video surveillance configuration, the iterations must be repeated to achieve optimal system performance. However, this is an inefficient and time consuming process. It is therefore desirable to have a systematic approach for designing a video surveillance system which best meets a user's existing or known future requirements.

SUMMARY

In one exemplary embodiment, the present invention is directed to a method of identifying a server for use in a network surveillance system comprising: selecting a camera configuration; determining a surveillance performance index for the camera configuration; selecting a server; determining a surveillance performance index for the server; comparing the surveillance performance index of the camera configuration with the surveillance performance index of the server; and choosing the selected server if the surveillance performance index of the server is equal to or exceeds the surveillance performance index of the camera configuration.

In another embodiment, the present invention is directed to a system for choosing a suitable server for a surveillance system comprising: an information handling system; a user interface provided by the information handling system; wherein a user may input camera configuration information to the user interface; and wherein the user interface selects an appropriate server using the camera configuration information input by the user.

In one exemplary embodiment, the present invention is directed to a method of designing a network surveillance system comprising: selecting a first component for the network surveillance system; determining a surveillance performance index for the first component; and selecting a second component for the network surveillance system based on the surveillance performance index of the first component.

Thus, the present disclosure provides systems and methods for efficiently configuring network surveillance systems. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 is a table of size per pixel for different frame rates.

FIG. 5 is a table of tested SPIs from disk array benchmark results.

FIG. 6 is a table of the SPIs of Intel Socket 771 processors, for up to four sockets per system.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
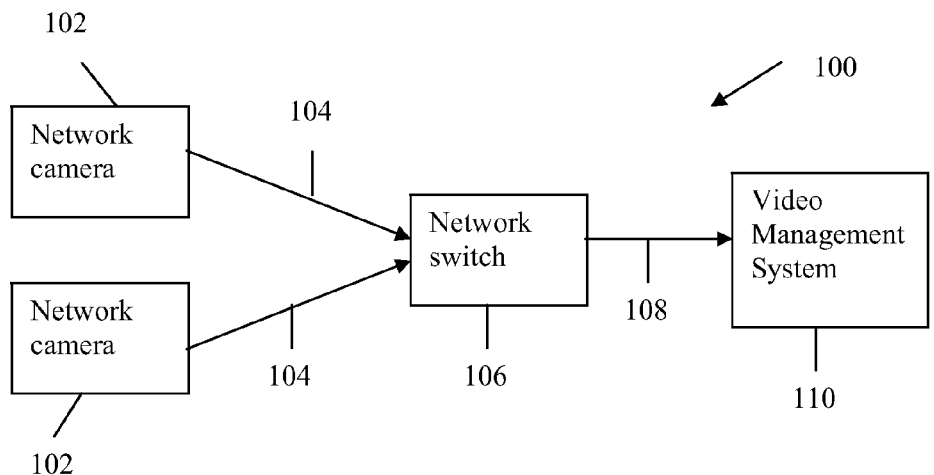
FIG. 1 is a first exemplary video surveillance system.

Shown in FIG. 1 is a block diagram of an exemplary Network Surveillance System ("NSS") denoted generally with reference numeral 100. The NSS 100 may include one or more network cameras 102. The network cameras 102 may be operable to digitize and compress the video images they capture. The network cameras 102 may include a network connector (not shown) that connects them to an IP-based network 104. The images captured by the network cameras 102 may be digitized and compressed and transmitted over the IP-based network 104 to a network switch 106. The network switch 106 may then transmit the data received from the network cameras 102 to a Video Management System ("VMS") 110 over an IP-based network 108. The VMS 110 may be any suitable information handling system that contains the necessary software to receive and process the information transmitted from the network cameras 102. As would be appreciated by those of ordinary skill in the art, with the benefit of this disclosure, the IP-based networks 104, 108 may be any suitable network such as a Local Area Network ("LAN"), Ethernet or the Internet.

Figure 2:
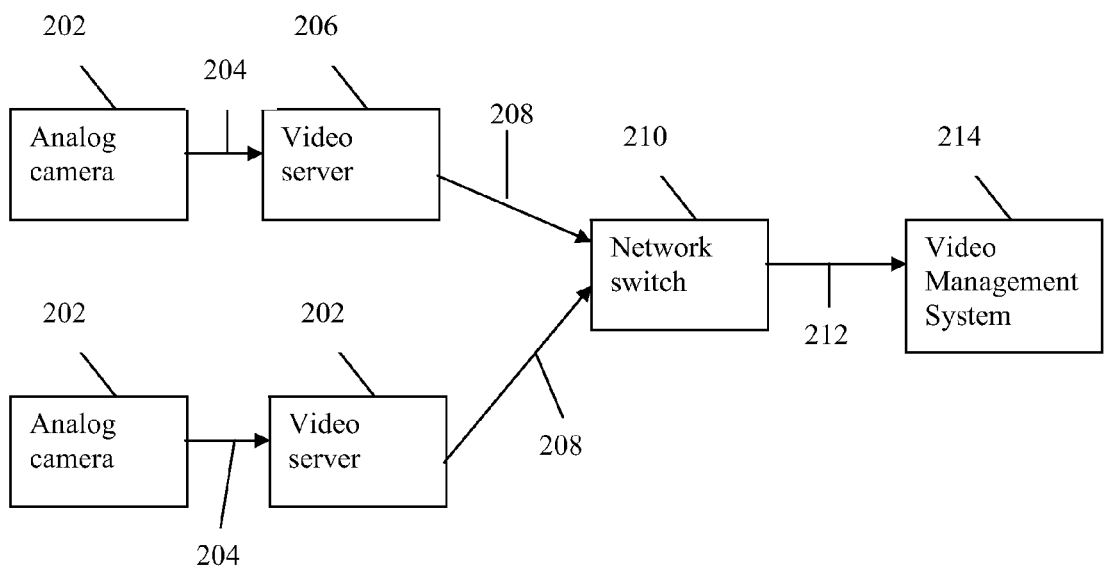
FIG. 2 is a second exemplary video surveillance system.

As shown in FIG. 2, in another exemplary embodiment of an NSS one or more analog cameras 202 may be used. In this embodiment, each analog camera 202 may be connected to a video server 206 through an analog cable 204. The video server 206 may digitize and compress the images received from the analog cameras 202. The video server 206 may then be connected to a network switch 210 through an IP-network 208. The digitized, compressed images may be transmitted from the video server 206 to the VMS 214 via the network switch 210 and the IP-networks 208 and 212. The IP-networks 208, 212 may be, for example, a LAN or an Internet connection.

The system and methods disclosed herein allow a user to optimize the design of a NSS using a Surveillance Performance Index ("SPI"). SPI is a numeric representation of streaming video, either in load or processing capability. Accordingly, SPI is an intermediary between camera load requirements and the capabilities of servers used in the NSS. In one exemplary embodiment, SPI of a component may be defined as the number of 10 million pixels per second of an average Motion Joint Photographic Experts Group ("MJPEG") frame compression that can pass through the slowest subsystem of the component. As would be appreciated by those of ordinary skill in the art, with the benefit of this disclosure, in another embodiment of the present invention the SPI may be defined differently. However, as is apparent to those of ordinary skill in the art, the system and methods disclosed herein remain applicable so long as the definition of the SPI value remains constant across the different system components. In this exemplary embodiment, the SPI value is defined in terms of the MJPEG because despite its large bandwidth, MJPEG is used widely in the surveillance industry due to its ability to freeze frame on any frame within a stream with near perfect clarity.

Figure 3:
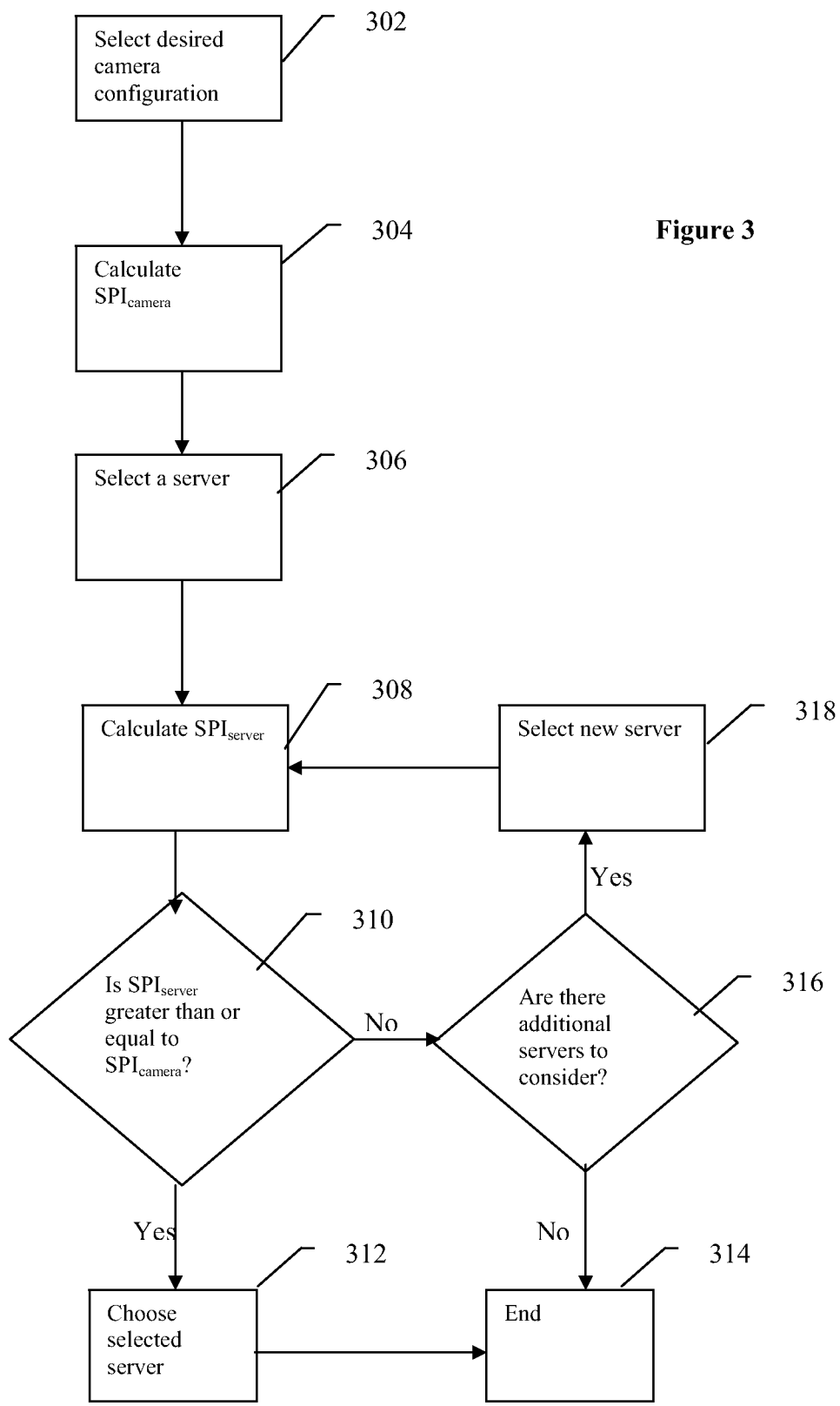
FIG. 3 is a flow diagram of a process for designing an optimal network surveillance system in accordance with an exemplary embodiment of the present invention.

FIG. 3 is a flow diagram of a process for designing an optimal NSS in accordance with an exemplary embodiment of the present invention, based on the selection of a camera configuration and a suitable server. First, at step 302, a user may select the desired camera configuration such as the number of cameras to be used, the resolution of the cameras and the camera frame rate.

Next, at step 304, the SPI for the selected camera configuration may be calculated. A study of IP based security systems has revealed that a standard 4CIF (Common Intermediate Format) frame of MJPEG averages 37 KB. This average is used as an assumed constant in the discussions that follow.

FIG. 4 shows the size per pixel for different frame rates and compression types. Tests were conducted to determine the values charted in FIG. 4. Specifically, videos were streamed across servers and the same videos were recorded to hard drives to determine the values tabulated in FIG. 4. As depicted in FIG. 4, although the SPI value determination is based on the MJPEG coder-decoder ("CODEC"), other CODEC's like MPEG4 are included due to different camera configurations. Accordingly, while the SPI value is based on MJPEG, it may be modified to be compatible with MPEG4 and H.264. Using the values in FIG. 4, the SPI for a given camera configuration may be determined by determining the total number of pixels based on resolution and frame rate that will pass per second.

Returning now to FIG. 3, at step 306, a server is selected to determine its compatibility with the NSS. At step 308 the SPI value for the selected server is calculated. As would be appreciated by those of ordinary skill in the art, with the benefit of this disclosure, a number of factors may impact the maximum capabilities of a server in a NSS. The factors that may affect the server capabilities include, for example, network bandwidth, disk array write speed bandwidth, memory bandwidth, and CPU speed. In accordance with the system and methods disclosed herein, the SPI for each component of the server may be determined. The overall server SPI will then be limited to the SPI of the slowest subsystem of the server. The server subsystems of interest may include the server's network interface, disk array and Central Processing Unit ("CPU") speed.

One of the server subsystems is the server's Network Interface Controller ("NIC"). Specifically, a server cannot record more data than can be physically transferred over its NIC. In accordance with the system and methods disclosed herein, the SPI of a NIC is defined as 85% of the theoretical speed of Gigabit TCP/IP communications, given standard TCP/IP over head. Accordingly, the SPI for the NIC of a server is the server's Gigabyte speed minus the TCP/IP overhead which is 79.69 Mbps.

Assuming that the load can be handled properly by the server NIC, the next determination must be the write speed of the disk array(s) in the server. For instance, in one embodiment, the disk arrays used may be 7200 rpm SATA and 15000 rpm SAS drives. An internal database of benchmarks for these disk arrays may be maintained in most RAID (0, 1, 5, 1+0, 5+0) configurations, up to 10 spindles. In an exemplary embodiment, benchmarks are primarily focused on write speed, with 80% priority given to random writes and 20% to sequential writes. Most surveillance software is less than 80% writes, however, 80% is used in conjunction with the methods disclosed herein to assume the worse case scenario. The table in FIG. 5 shows some tested SPI's from these benchmark results.

Another factor that impacts the server's SPI is the CPU. A combination of real world performance and synthetic benchmarks may be used to determine the SPI for any given CPU. FIG. 6 depicts the SPI of Intel Socket 771 processors, for up to four sockets per system which were determined by streaming video over servers.

While memory bandwidth may also impact the server's SPI, as would be appreciated by those of ordinary skill in the art, with the benefit of this disclosure, that is typically not the limiting factor for a given server. For instance, the SPI for DDR2-ECC 667 MHz RAM which is often used in servers is around 4095.7. Accordingly, the memory bandwidth may essentially be disregarded when determining the server SPI.

The smallest SPI value of the server sub-systems defines the SPI of the server. Returning now to FIG. 3, once the SPI of the selected server is determined, at step 310 the SPI value of the selected server is compared with the SPI value of the camera configuration. If the SPI value of the selected server is equal to or greater than the SPI value of the camera configuration, then the selected server is chosen for the NSS at step 312 and the process ends at step 314.

In contrast, if at step 310 the SPI value of the selected server is less than the SPI value of the camera configuration, then at step 316 it is determined whether there are other servers available that may be used in the NSS. If there are no additional servers available, the process terminates at step 314. If another server is available, a new server is selected for consideration in conjunction with the desired NSS at step 318. The process then returns to step 308 to determine if the newly selected server is suitable for the desired camera configuration. This process is repeated until a server that matches the desired camera configuration is identified or there are no servers that meet the needs of the desired configuration.

Accordingly, the right server for a NSS may be selected using the SPI values of the camera configuration and the server. The SPI value of the camera configuration used may be calculated based on user preferences such as the desired resolution and the number of frames per second. Similarly, a SPI value may be calculated for the available servers. The SPI value of the camera may then be compared to the SPI for each available server and any server with an SPI that reaches or exceeds this SPI value may then be used.

As would be appreciated by those of ordinary skill in the art, with the benefit of this disclosure, in one exemplary embodiment the method disclosed herein may be carried out using an information handling system (not shown). Specifically, an information handling system may be used to provide a user interface where the user can select a desired camera configuration. For instance, the user may input the type of camera to be used, the number of cameras to be used, the desired resolution, the desired frame rate, etc. The information handling system may then determine the SPI of the selected camera configuration.

The SPI values for the different available servers may be loaded in the information handling system. The information handling system may then compare the SPI value of the selected camera configuration with the SPI value of the available servers to identify one or more servers that may be used with that configuration. In one embodiment, the information handling system may issue a message to the user if there are no servers that would match the selected criteria. In another exemplary embodiment, the price of each server may also be loaded in the information handling system. The information handling system may then identify the cheapest server that would meet the user's desired camera configuration. As would be appreciated by those of ordinary skill in the art, additional server parameters such as make, model, etc. may also be used to further narrow the server selection to identify the server that best meets a user's application.

As would be appreciated by those of ordinary skill in the art, with the benefit of this disclosure, any desirable information may be loaded in the information handling system. For instance, the information handling system may include user guides, brochures or other information about the different components that may be used in a NSS. Additionally, the information handling system may be operable to provide a user with sample images from the different cameras available to the user. In one exemplary embodiment, the user may be able to select desirable camera parameters such as frame rate and resolution and the information handling system may generate graphics simulating images that would be produced by the camera.

Moreover, the system and methods disclosed herein allow a user to select servers based on the future needs of the NSS such as the use of additional cameras or future changes in the system characteristics. Specifically, a user who plans to increase the number cameras used in the NSS or otherwise modify the NSS may input the future system needs into the user interface and determine the appropriate server that can accommodate future changes without actually purchasing and assembling the system components.

As would be appreciated by those of ordinary skill in the art, although the present invention is discussed in conjunction with a digital, wireless video surveillance system, the system and methods disclosed herein may also be used in conjunction with a wired and/or analogue video surveillance system. Moreover, although the present invention is discussed in relation to determining the right server based on a camera configuration, the same methods may be used for selecting the other components of an NSS. Specifically, the methods disclosed herein may be used to design an end-to-end IP surveillance system that may include servers, data storage devices, Power over Ethernet ("PoE") switch, patch panels, Uninterruptible Power Supply ("UPS"), patch cables, cabinet, slide-away monitor, keyboard, mouse and the necessary software. The SPI value for one or more of the components of the NSS may be calculated and used to match the components that would optimize the overall NSS. For example, in another embodiment, the user may select a desired camera configuration. The methods disclosed herein may then be used to identify the optimal PoE switch or any of the other components of the NSS using SPI values. Accordingly, the system and methods disclosed herein allow a user to design a NSS before purchasing the NSS components and eliminate the guesswork that is currently necessary when designing a NSS.

Although the present disclosure has been described in detail, it should be understood that various changes, substitutions, and alterations can be made hereto without departing from the spirit and the scope of the invention as defined by the appended claims.

Example I

In accordance with the methods disclosed herein, a user may select a camera configuration which includes 28 cameras with 4CIF, MJPEG and 7 frames per second. The following calculations may then be carried out to determine if a FTL DE295030Q2 server is appropriate for that configuration:

Number of pixels in a 4CIF frame: 640×480=307200 Pixels

Average size per pixel: 1×(37 KB/307200p)=1.02044E-4 KB/p

Data size per second:

$$(1.02044E\text{-}4 \text{ KB/p}) \times (7 \text{ f/s.cam}) \times (307200 \text{ p/f}) \times (28 \text{ cam}) \times (1 \text{ MB}/1000 \text{ KB}) = 7.52 \text{ MB/s}$$

The SPI for the camera configuration may then be calculated as:

$$SPI_{camera\ config} = (7.252 \text{ MB/s}) \times (1000 \text{ KB/MB}) \times px \times (1E\text{-}7p/1.02044E\text{-}4 \text{ KBs}) = 7.107 \text{ SPI load on system.}$$

Next, the server sub-systems are considered. Specifically, for the FTL DE295030Q2 server, the sub-system SPIs are:

Disk array=85.36 SPI
Network Interface=81.60 SPI
CPU=53.13 SPI

RAM=4095.7 SPI

Accordingly, the lowest SPI of the server sub-systems is that of the CPU at 53.13. Therefore, the $SPI_{server}$ is 53.13. Because the $SPI_{server}$ (53.13) is greater than the $SPI_{camera\ config}$ (7.107), this server is suitable for the selected camera configuration.

What is claimed is:

1. A method of designing a network surveillance system, comprising:
    receiving a camera configuration selection at a user interface, wherein the user interface is provided by an information handling system;
    determining at a processor of the information handling system a surveillance performance index for the camera configuration, wherein the surveillance performance index for the camera configuration comprises a data load capability of the camera configuration;
    receiving a server selection at the user interface;
    determining at the processor a surveillance performance index for the selected server, wherein the surveillance performance index for the selected server comprises a data processing capability of the selected server;
    comparing the surveillance performance index of the camera configuration with the surveillance performance index of the selected server; and
    identifying the selected server to be included in the network surveillance system if the surveillance performance index of the server is equal to or exceeds the surveillance performance index of the camera configuration, wherein the selected server is not connected to the network surveillance system when it is identified.

2. The method of claim 1, wherein the network surveillance system is an IP based network.

3. The method of claim 1, wherein receiving a camera configuration selection at a user interface comprises receiving a selected one of a number of cameras, a camera resolution and a camera frame rate.

4. The method of claim 1, wherein determining the surveillance performance index of one of the camera configuration and the server comprises determining number of ten million pixels per second of an average MJPEG frame compression that can pass through the slowest subsystem of one of the camera configuration and the server.

5. The method of claim 1, wherein the camera is an IP camera.

6. The method of claim 1, wherein the camera is an analog camera.

7. The method of claim 1, wherein determining the surveillance performance index of the server comprises:
    determining a surveillance performance index for each server sub-system; and
    designating the smallest surveillance performance index of the server sub-systems as the surveillance performance index of the server.

8. The method of claim 7, wherein the server sub-systems are selected from the group consisting of a network interface, a disk array, a central processing unit and a memory unit.

9. A system for designing a network surveillance system comprising:
    an information handling system;
    a user interface provided by the information handling system;
    wherein
        the information handling system receives a camera configuration from the user interface;
        the information handling system selects an appropriate server to be included in the network surveillance system using the camera configuration
        the appropriate server is selected based, at least in part, on a surveillance performance index of the camera configuration;
        the surveillance performance index of the camera configuration comprises a data load capability of the camera configuration; and
        the server is not connected to the network surveillance system when it is selected.

10. The system of claim 9, wherein the information handling system is selected from the group consisting of a personal computer and a laptop computer.

11. The system of claim 9, wherein the camera configuration information is selected from the group consisting of a number of cameras, a camera resolution, and a camera frame rate.

12. The system of claim 9, wherein the information handling system determines a surveillance performance index for the camera configuration.

13. The system of claim 9, wherein a surveillance performance index of an available server is stored in the information handling system.

14. The system of claim 13, wherein the information handling system selects the appropriate server by comparing the surveillance performance index of the available server and a surveillance performance index of the camera configuration.

15. The system of claim 13, wherein the price of the available server is stored in the information handling system.

16. The system of claim 15, wherein the information handling system selects the appropriate server using the surveillance performance index of the server, the price of the server and a surveillance performance index of the camera configuration.

17. A method of designing a network surveillance system comprising:
    receiving a selection of a first component for the network surveillance system at a user interface, wherein the user interface is provided by an information handling system;
    determining at a processor of the information handling system a surveillance performance index for the first component, wherein the surveillance performance index for the first component comprises at least one of a data load capability and a data processing capability of the first component; and
    selecting a second component to be included in the network surveillance system based on the surveillance performance index of the first component, wherein the second component is not connected to the network surveillance system when it is selected.

18. The method of claim 17, wherein selecting a second component for the network surveillance system based on the surveillance performance index of the first component comprises:
    determining a surveillance performance index for the second component; and
    selecting the second component if the surveillance performance index of the second component is not less than the surveillance performance index of the first component.

19. The method of claim 17, wherein at least one of the first component and the second component is selected from a group consisting of a camera configuration, a server, a data storage device and a switch.

20. The method of claim 17, wherein the step of determining the surveillance performance index for the first component and the step of selecting a second component for the network surveillance system based on the surveillance performance index of the first component are performed by an information handling system.

* * * * *